Figure 6:
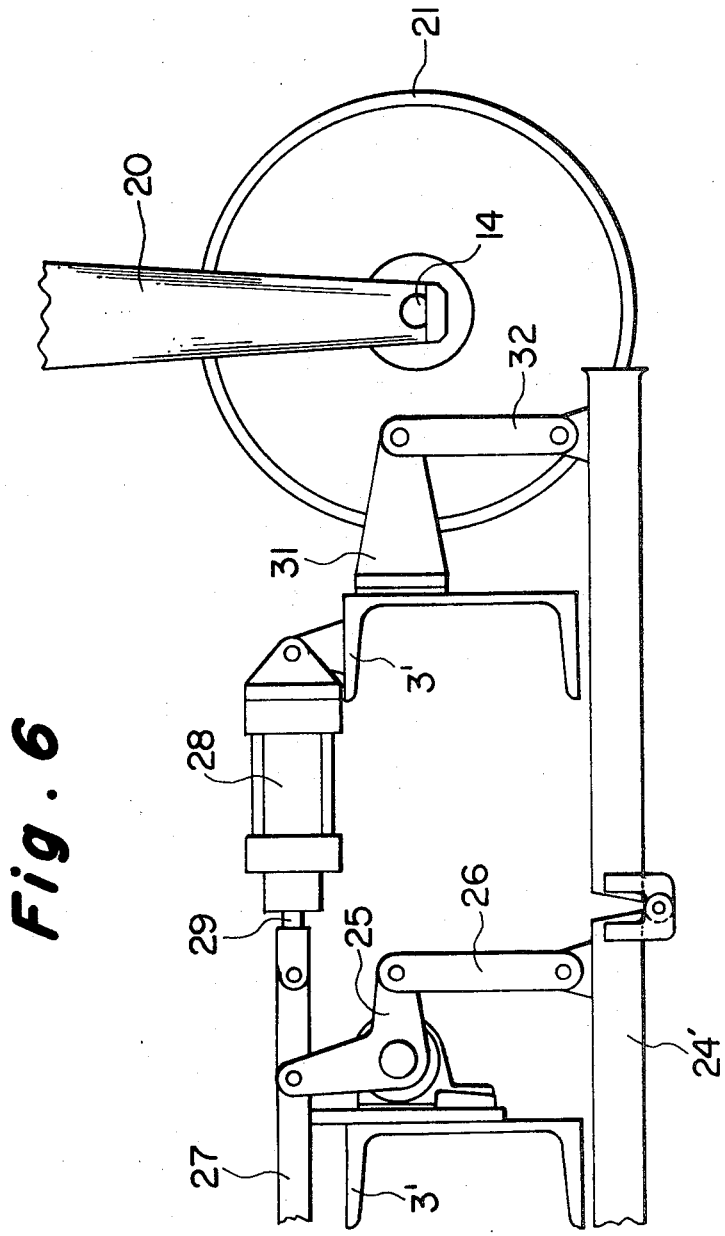

United States Patent
Itoh et al.

[15] 3,682,469
[45] Aug. 8, 1972

[54] DEVICE FOR HANDLING PLATES WITH SMOOTH SURFACE

[72] Inventors: Yohnosuke Itoh; Masataka Miki, both of Tokyo; Makoto Nishiyama; Yuhnosuke Uda, both of Yokohama City; Masaoki Terashima, Tokyo, all of Japan

[73] Assignee: Nippon Yakin Kogyo Company Limited, Tokyo, Japan

[22] Filed: March 9, 1971

[21] Appl. No.: 122,355

[30] Foreign Application Priority Data

March 14, 1970 Japan .......................45/21367

[52] U.S. Cl. .................271/12, 198/180, 214/6 FS, 214/8.5, 214/89, 271/74
[51] Int. Cl. ..............................................B65g 57/04
[58] Field of Search ....271/12, 74, 5, 6, 11; 198/102, 198/93, 94, 179, 180; 214/6 FS, 6 DS, 8.5 D, 89, 1 B, 1 T

[56] References Cited

UNITED STATES PATENTS 2,661,948  12/1953  Montgomery ...............271/12
3,583,614  6/1971  Foster, Jr. .....................271/74

*Primary Examiner*—Robert J. Spar
*Attorney*—Fleit, Gripple & Jacobson

[57] ABSTRACT

A handling device for mounting and dismounting plates with smooth surface to and from a suspension-type conveyor assembly, without interrupting the movement of the main conveyor means of the conveyor assembly. A plurality of auxiliary conveyor means are so controlled as to transfer the plates to and from the main conveyor means while running at the same linear speed with the main conveyor means. For transferring to the main conveyor means, the auxiliary conveyor means are raised above the transferring level after the transfer and then stopped. For receiving from the main conveyor means, the auxiliary conveyor means are lowered below the transferring level together with the plates after the transfer.

6 Claims, 8 Drawing Figures

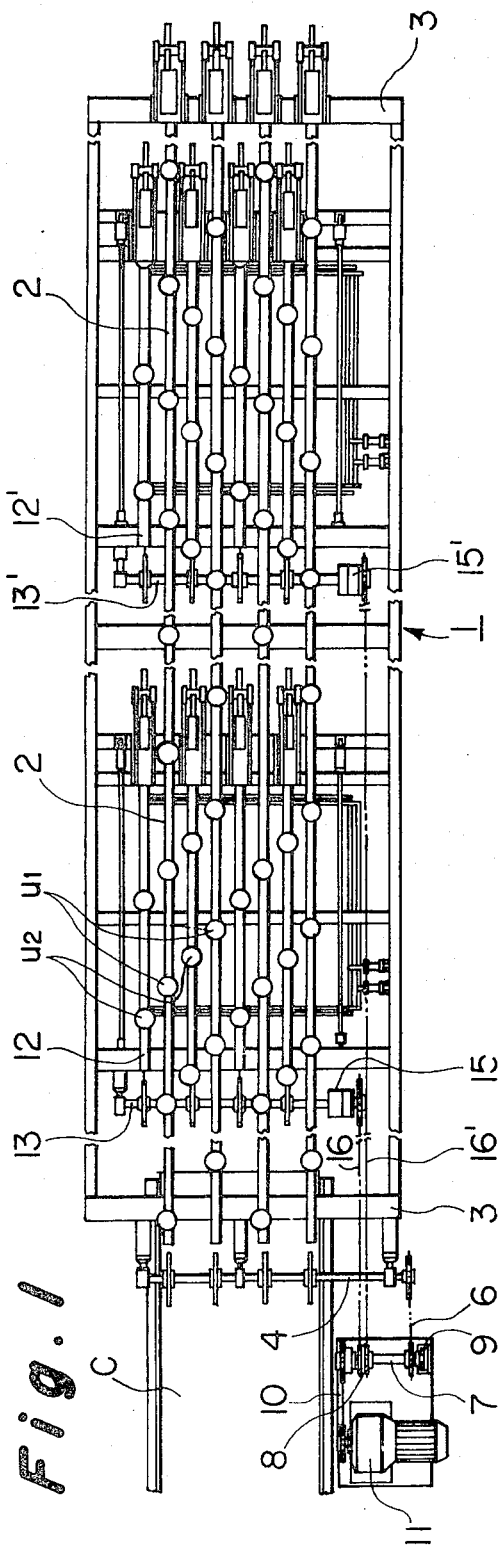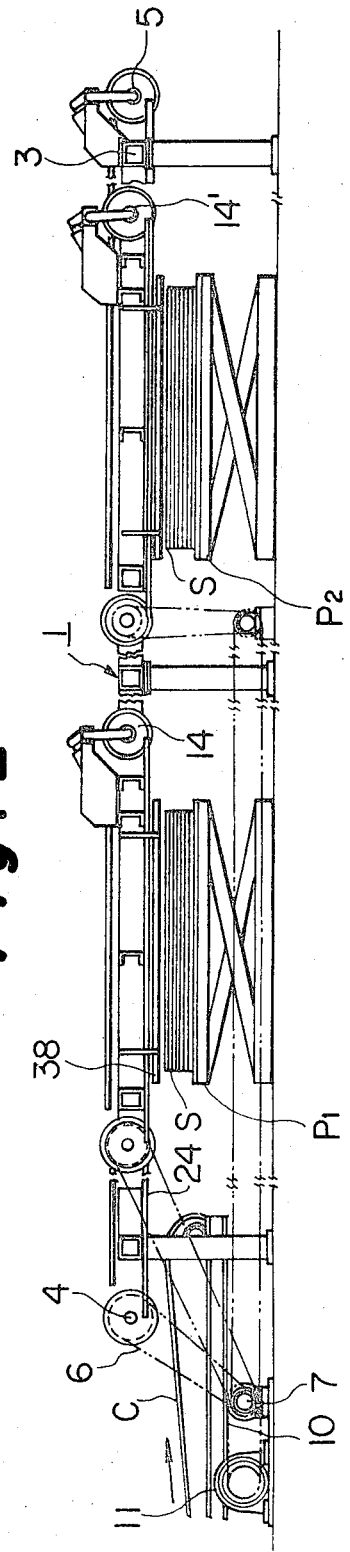

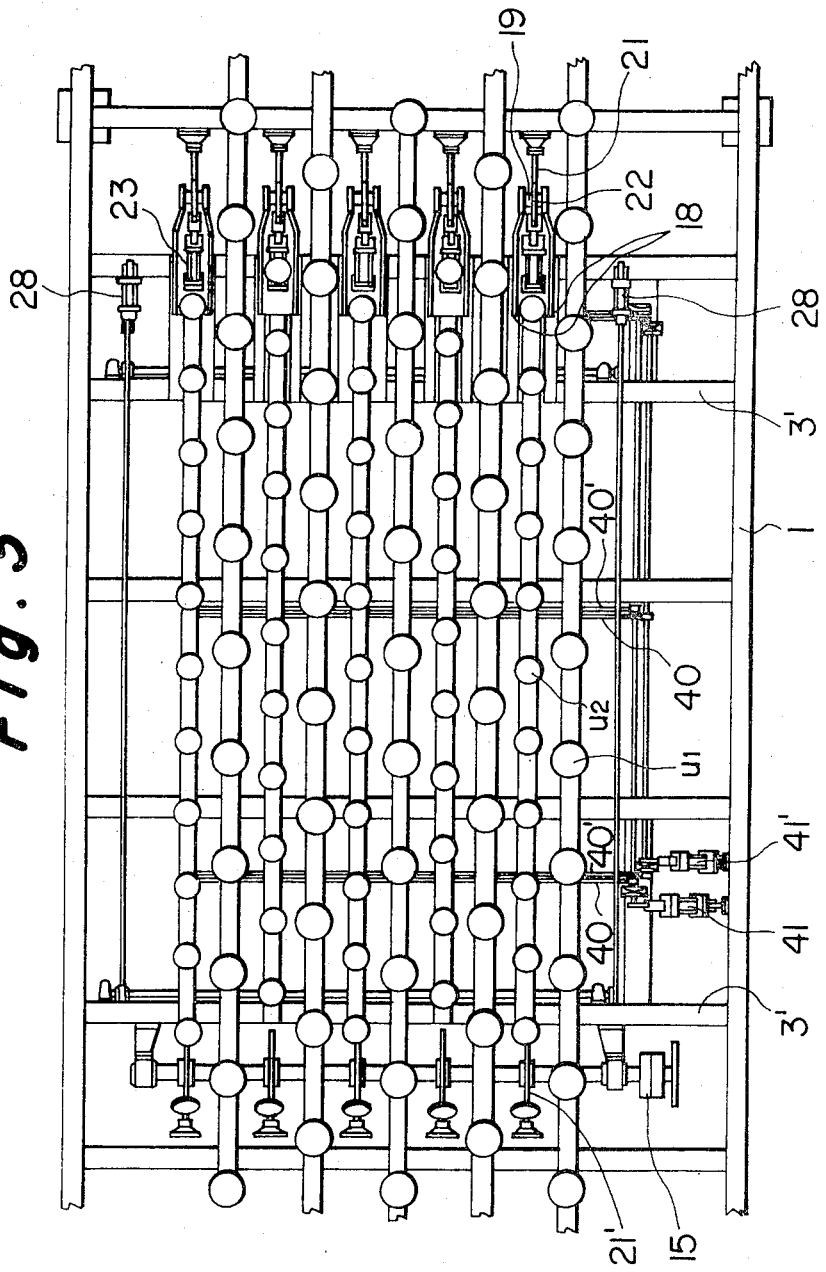

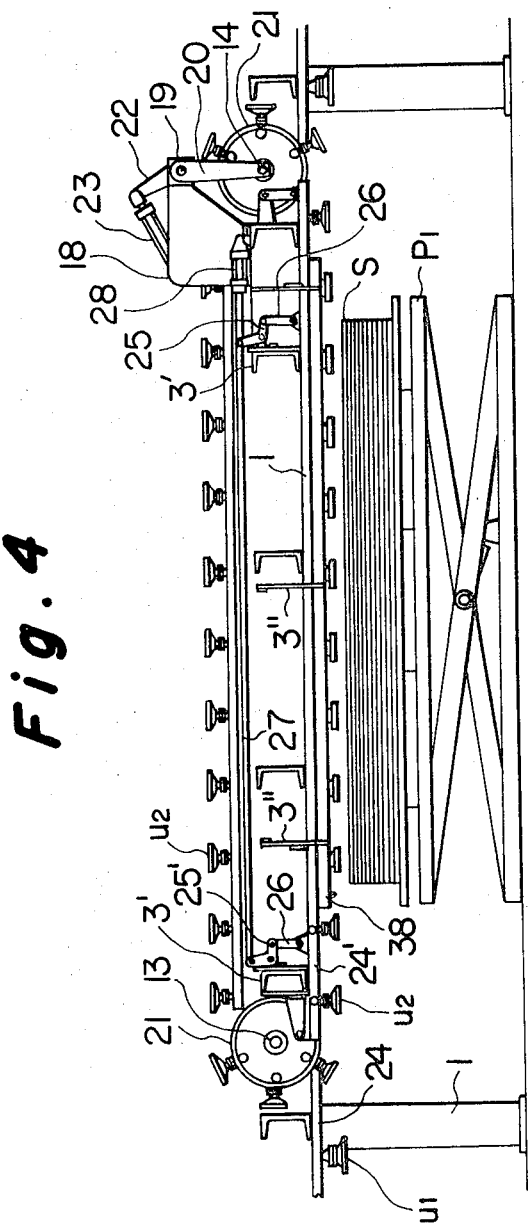

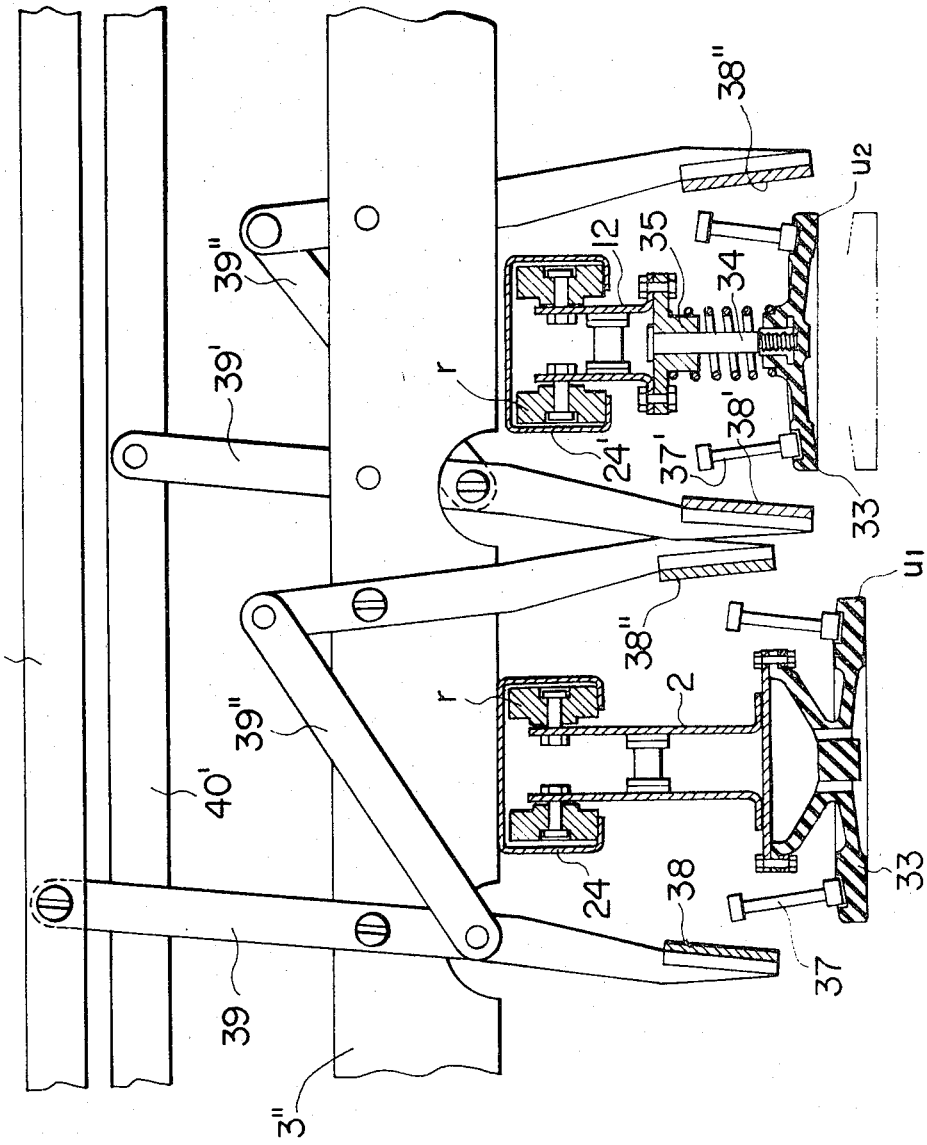

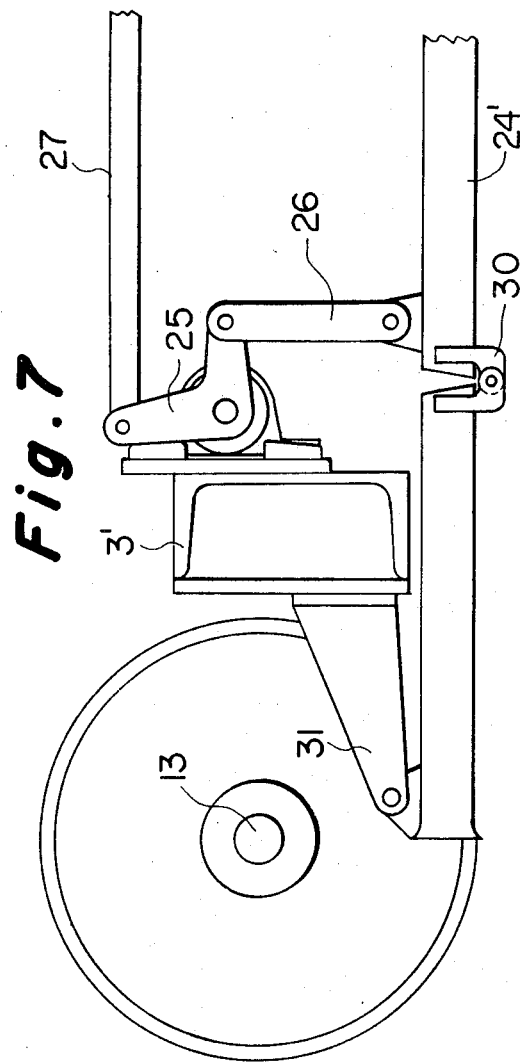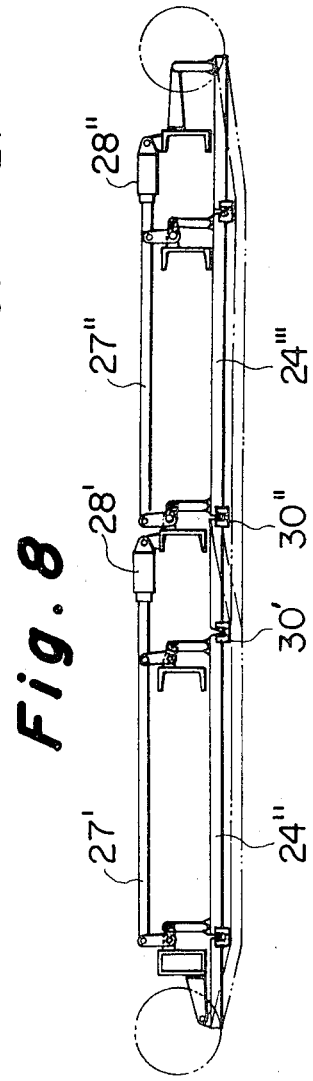

DEVICE FOR HANDLING PLATES WITH SMOOTH SURFACE

This invention relates to a device for handling plates with smooth surface, and more particularly to a device for mounting and dismounting plates with smooth surface relative to a suspension-type conveyor assembly.

Examples of the above-mentioned "plates with smooth surface" include glass plates, polished rolled metal plates, such as stainless steel plates, and veneered wood plates which are painted or thoroughly polished.

The present invention provides a device for mounting and dismounting plates with smooth surface to and from a suspension-type conveyor assembly without interrupting the movement of main conveyor means of the assembly. The device of the present invention can be used in many different industrial activities: namely, in depiling one or more stacks of plates by successively mounting the plates on a continuously moving suspension-type main conveyor means from the stacks; in piling plates by successively dismounting them from the conveyor assembly as they are delivered to desired positions, for the purpose of sorting by the grade or size of the plates or storing at a predetermined position or packing in boxes; in repiling the plates with smooth surface simply by combining the aforesaid depiling and piling; and in transferring the plates with smooth surface from one conveyor to another conveyor.

In handling plates with smooth surface, especially plates with polished or with mirror-like plated surface, due care must be taken not to scratch the surface, because even a slightest scratch of the surface may deteriorate the commercial value of the plates, and in certain cases it may make the plates completely valueless scraps.

The applicants have disclosed in copending Japanese Pat. Application a suspension-type conveyor for plates with smooth surface, comprising one or more endless conveyors of wrapping type driven in a direction for conveying the plates, and a plurality of flexible disk-shaped suction cups secured to the endless conveyors. The endless conveyor may be a looped chain driven by a pair of sprockets, and the suction cups are secured to the looped chain for moving together with the chain, so that plates with smooth surface may be carried by the suction cups by vacuum pressure applied thereto and moved together with the looped chain. Accordingly, the plates can be conveyed as the looped chain rotates. When the plates are conveyed to a desired position, they can be released from the suspension-type conveyor by breaking the vacuum pressure at the suction cups.

With such known suspension-type conveyors, it has been necessary to hold the movement of the conveyor at the time of mounting the plates and at the time of dismounting them relative to the conveyor. To facilitate the loading and unloading of the conveyor in position, stoppers are generally used at the mounting and dismounting positions. With such stoppers, if the conveyors are driven at a high speed to achieve a high transfer efficiency, the plates being conveyed inevitably strikes the stoppers with a high kinetic energy, resulting in a high impulsive shock. Such high impulsive shock may increase the risk of breaking fragile plates, e.g., glass plates, as well as the risk of scratching smooth surface by the rubbing of the surface with the suction cup in response to the movement of the plates due to the shock. As a result, it has been necessary to operate such suspension-type conveyor at a comparatively low speed, and hence, the transfer efficiency of such suspension-type conveyor has been relatively low.

With the reduced speed, the time necessary for conveying the plates over a given distance increases. Since the suction cups have inevitable gas leakage, there is a limit in the duration of holding a plate at one time. Consequently, the distance over which the known suspension-type conveyor can carry plates is limited.

The aforesaid holding of the movement of the conveyor for loading and unloading tends to complicate the control system, because the holding necessitates the braking for deceleration as well as acceleration for restarting. When the plates being conveyed are comparatively heavy, sudden acceleration and quick brake must be avoided, because the large inertia of the heavy plate may surpass the suction of the vacuum pressure to cause the plate to drop from the conveyor. Thus, the intermittent holding of the operation of the conveyor movement results in a sizable loss time due to the aforesaid inability of quick acceleration and deceleration. Consequently, the overall efficiency of the known suspension-type conveyor has been fairly low.

Therefore, an object of the present invention is to obviate the aforesaid difficulties of the known suspension-type conveyors of plates, by providing an improved handling device for loading and unloading plates to and form a suspension-type conveyor assembly without interrupting the continuous rotation of an endless conveying member of wrapping-type incorporated in the conveyor assembly.

According to the present invention, there is provided a handling device for mounting and dismounting plates with smooth surface relative to a suspension-type conveyor, which conveyor includes at least one main endless conveying means of wrapping-type and rows of suction cups secured to the conveying means, the handling device comprising a plurality of auxiliary suspension-type conveying means disposed between adjacent rows of the suction cups of the main endless conveying means, the auxiliary conveying means having suction cups similar to those of the main conveying means, the span of each auxiliary conveying means being considerably shorter than that of the main conveying means, whereby the plates can be mounted and dismounted to and from the suspension-type conveyor without interrupting the movement of the main conveying means by using the suction of the auxiliary conveying means, while controlling the running speed of the auxiliary conveying means between zero speed and the speed of the main conveying means. As a result, the present invention greatly improves the speed and capacity of the process for handling plates with smooth surface.

For a better understanding of the invention, reference is made to the accompanying drawings, in which:

FIG. 1 is a plan view of a conveyor assembly for handling plates with smooth surface, incorporating a handling device according to the present invention;

Like parts are designated by like numerals and symbols throughout the drawings.

FIGS. 1 and 2 illustrate a conveyor assembly, or a sheet piler, for sorting and piling output plates or sheets from a certain process in a number of separate piles in accordance with size or grade of the plates. For simplicity's sake, only two piles of plates are shown in the figures, but it is understood that any number of piles can be formed based on the principles of the present invention. Thus, the sheet piler of FIGS. 1 and 2 acts to sort sheets S delivered from a feeder belt conveyor C into two groups and to pile them on two constant-height horizontal tables $P_1$ and $P_2$, respectively. The constant-height horizontal table $P_1$ or $P_2$ keeps a constant level at the top of the sheets S piled thereon, by lowerig the level of the table itself each time a new sheet S is piled thereon by a distance equivalent to the thickness of the sheet thus piled.

The sheet piler or the suspension-type conveyor assembly, as shown in FIGS. 1 and 2, comprises a framework 1 for carrying one or more looped chains 2 constituting main conveyors of wrapping-type, which framework 1 includes spaced cross beams 3 for supporting the looped chains 2 at intermediate points thereof. The main conveyor chains 2 are aligned with the feeder belt conveyor C.

The looped chains 2 of the main conveyors are driven by a geared motor 11 through a transmission consisting of a V-belt 10, a clutch 8, a transmission shaft 7, a transmission chain 6, and a drive shaft 4. The drive shaft 4 carries a number of drive wheels, e.g., sprockets, which operatively engage the main conveyor chains 2. The transmission between the geared motor 11 and the drive shaft 4 includes a brake 9. Driven shafts 5 (FIG. 2) are provided at the opposite ends of the main conveyor looped chains 2 to the drive shaft 4, for ensuring proper tension in the main conveyor chains.

The transmission shaft 7 also acts to drive the feeder belt conveyor C through a V-belt conveyor system (not shown) and a drive shaft (not shown).

In the embodiment, as illustrated in FIGS. 1 to 4, the main conveyor looped chains 2 are disposed in parallel with each other, and two groups of auxiliary chain conveyors 12, 12' are disposed in each space between the adjacent main conveyors in longitudinal alignment with each other.

The auxiliary chain conveyors 12 and 12' are provided with drive shafts 13, 13', driven shafts 14, 14', clutch brakes 15, 15' mounted on the drive shafts 13, 13', and transmission chains 16, 16', respectively.

A plurality of flexible disk-like suction cups $u_1$ are secured to each of the main conveyor chains 2 at uniform intervals so as to travel with the rotation of the looped chain. Similarly, a plurality of flexible disk-like suction cups $u_2$ are secured to each of the auxiliary chain conveyors 12, 12' in a movable manner together with the corresponding auxiliary chain conveyor. Thus, the main and auxiliary conveyors 2 and 12, 12' become suspension-type.

The main conveyor looped chains 2 engage a common driven shaft 5 at the end opposite to their drive shaft 4, and the auxiliary conveyor chains 12, 12' engage common driven shafts 14, 14', respectively, at the end opposite to the drive shaft 13 or 13'. Such driven shafts are to produce suitable tension in each of the related looped chains. Since the construction and function of the three driven shafts 5, 14, and 14' are substantially identical with each other, the construction of the driven shaft 14 will be described in detail by referring to FIGS. 3 and 4. It should be understood that the construction of the other driven shafts 5 and 14' is similar to that of the driven shaft 14 for carrying out similar function.

For each auxiliary conveyor chain 12, a pair of brackets 18 are secured to the framework 1, and a shaft 19 is pivotally supported by the brackets 18. A pair of arms 20 are integrally secured to the shaft 19, so as to hold the driven shaft 14 at the free ends of the arms 20. A sprocket 21 is rotatably mounted on each driven shaft 14. An actuating lever 22 is secured to the driven shaft 14 at one end thereof, while the opposite end of the actuating lever 22 is connected to a pusher 23 fixed to the framework 1. The pusher 23 can be a hydraulic cylinder having one end secured to the framework 1 and the opposite end connected to the actuating lever 22. Thus, by regulating the pusher 23, the angular position of the actuating lever 22 relative to the axis of the driven shaft 19 can be controlled. Accordingly, the angular position of the driven shaft 19 and the arms 20 swing about the axis of the shaft 19 in response to the angular movement of the actuating lever 22, so as to swing the driven shaft 14 about the axis 19 together with the sprocket 21. Consequently, the effective distance between the drive shaft 13 and the driven shaft 14 is regulated by the pusher 23, for regulating the tension applied to the auxiliary conveyor chain 12 spanned between the two sprockets 21 carried by the drive and driven shafts 13 and 14. The pusher 23 can be replaced with any other suitable means for effecting the aforesaid swinging of the actuating lever 22. For instance, a spring may be used in lieu of the pusher 23.

Referring to FIG. 5, chain guides 24, 24' are disposed along the paths of the conveyor chains 2, 12, and 12', especially along the lower horizontal parts of their looped paths. In the embodiment of FIG. 5, each of the chain guides 24 and 24' consists of a channel steel with lips formed along the open end thereof, so as to hold rolls r pivotally secured to the corresponding conveyor chains. Thus, the movement of the conveyor chains is properly controlled by the chain guides 24, 24'.

The chain guides 24 for the main conveyor chains 2 are supported by the cross beams 3, 3 of the framework 1, in such a manner that the chain guides 24 keep the main conveyor chains 2 to run along fixed paths. On the other hand, the chain guides 24' for the auxiliary conveyor chains 12 and 12' are vertically movable, in order to selectively shift the level of the suction cups $u_2$ of the auxiliary conveyor chains 12 and 12' between above and below the fixed level of the suction cups $u_1$ of the main conveyor chains 2. Thus, the suction cups $u_2$ of the auxiliary conveyor chains 12 and 12' act to vertically bring each plate S to be conveyed toward the suction cups $u_1$ of the main conveyor chain 2 as well as away from the cups $u_1$.

A mechanism for actuating such vertical movement of the chain guides 24' for the auxiliary conveyor chains 12 and 12' will now be described by referring to FIGS. 6 and 7. Each chain guide 24' is suspended from auxiliary beams 3' secured to the framework 1, by means of links 26 each having its lower end pivotally connected to the chain guide 24' and its upper end pivotally connected to one arm of a bell crank 25 fastened to the auxiliary cross beam 3'. The other arm of each bell crank 25 is pivotally connected to a horizontal operating lever 27, of which one end is operatively connected to the rod 29 of another pusher 28, similar to the pusher 23 of the driven shafts 5, 14, and 14'. As the rod 29 is actuated by the pusher 28, the operating lever moves substantially horizontally together with vertical arms of the bell cranks 25, so that the horizontal arms of the bell cranks 29 swings vertically for raising or lowering the links 26. As a result, the chain guides 24' are vertically moved in response to the actuation of the rod 29 of the pushers 28. In the embodiment, as illustrated in FIGS. 3 and 4, five chain guides 24' are controlled by a pair of pushers 28.

The pushers 28 for controlling the vertical movement of the chain guides 24' of the auxiliary conveyor chains 12 and 12' must be strong enough to cause the lower part of the looped path of corresponding conveyor chain downward against the tension caused therein by the pushers 23. The vertical movement of the chain guides 24' for the auxiliary conveyors 12 and 12' is for carrying plates S toward and away from the suction cups $u_1$ of the main conveyor chain 2.

In the embodiment of FIGS. 6 and 7, in order to keep the effective part of each chain guide 24' horizontally during its vertical reciprocation, a pair of flexible joints 30 are mounted at longitudinally opposite ends thereof, so as to support the chain guides 24' by brackets 31 through links 32, which brackets 31 are secured to auxiliary cross beams 3'. Thus, that portion of the chain guide which is located between the two flexible joints 30 is always kept horizontal.

Referring to FIG. 5, the suction cup $u_1$ of the main conveyor chain 2 has a central boss made of thick resilient material and peripheral flexible wall 33 connected to and surrounding the boss. The lower surface of the suction cup $u_1$, as seen in FIG. 5, is engageable with the plate S to be carried thereby. The upper end of the cup $u_1$ is directly connected to one of the links of the main conveyor chain 2. The construction of the suction cups $u_2$ of the auxiliary conveyor chain 12 or 12' is similar to that of the cup $u_1$, except that each cup $u_2$ is connected by a connecting rod 34 to a guide flange 35 secured to the link of the auxiliary conveyor chain 12 or 12'. A coiled spring 36 is inserted between the guide flange 35 and the suction cup $u_2$, so as to surround the connecting rod 34.

A pair of feeler rods 37 are secured to the upper surface of the suction cup $u_1$ at diametrically opposite portions thereof, so as to be engageable with brake guides 38 and 38'', as shown in FIG. 5. When the brake guides 38 and 38'' move toward the center of the suction cups $u_1$, the guides engage the feeler rods 37 to turn up the peripheral portion of the cup $u_1$, for releasing the suction and allowing the plate S to become separated from the cup $u_1$. Similarly, feeler rods 37' are secured to the suction cups $u_2$ for the auxiliary conveyor chains 12 and 12', so as to be engageable with the corresponding brake guides 38' and 38'', for releasing the suction at the cups $u_2$. To actuate the brake guides 38 and 38', additional cross beams 39'' are provided across the framework 1 (FIGS. 4 and 5), for pivotally carrying brake operating levers 39 and 39', respectively. The upper ends of the operating levers 39 and 39' are connected to actuating beams 40 and 40', respectively. Referring to FIG. 3, separate pushers 41 and 41' are provided to reciprocate the actuating rods 40 and 40', respectively. The arrangement is such that the suction cups $u_1$ are released only when the pusher 41 is actuated, and the suction cups $u_2$ of the auxiliary conveyor 12 or 12' are released only when the corresponding pusher 41' is actuated.

In operation of the embodiment, as illustrated in FIGS. 1 to 7, the feeder belt conveyor C feeds processed sheets or plates S at a speed substantially identical with the linear speed of the main conveyor chain 2, so that the plates S are continuously carried by the suction cups $u_1$ of the main conveyor chain 2 as they arrive at the conveyor. It should be noted here that the identical linear speed between the feeder conveyor belt C and the main conveyor chain 2 results in the zero relative speed between the plates S and the suction cups $u_1$. Thus, there is no risk of scratching the plate S by the cups $u_1$. The main conveyor chains 2 carry the plate S toward the horizontal tables $P_1$ or $P_2$.

As the plate S approaches the desired one of the horizontal table $P_1$ or $P_2$, the auxiliary conveyor chains 12 or 12' are accelerated to the same linear speed as the main conveyor chains 2.

When the linear speed of the auxiliary conveyor chains 12 or 12' becomes identical with that of the main conveyor chains 2, the transfer of the plate S from the suction cups $u_1$ to the suction cups $u_2$ takes place. To this end, the chain guides 24' for the auxiliary conveyor chains 12 or 12' is lowered from the position as shown in FIG. 5, by means of the pushers 28, the operating levers 27, the bell cranks 25, and the links 26. Thus, the level of the suction cups $u_2$ of the auxiliary conveyor chains 12 and 12' is lowered, as shown by phantom lines in FIG. 5, so as to engage the plate S without scratching it due to the identical horizontal linear speed therebetween. Then, the suction of the cups $u_1$ for the main conveyor chain 2 is released by means of the pusher 41, actuating beams 40, and the operating levers 39, for causing the brake guides 38 to engage the feeler rods 37. Thus, the transfer of the plates S from the suction cups $u_1$ to the suction cups $u_2$ is completed, and hence, the plate S is now carried by the auxiliary conveyor chains 12 or 12' but not by the main conveyor chains 2.

When the plate S is brought to a position immediately above the desired horizontal table $P_1$ or $P_2$, the movement of the auxiliary conveyor chains 12 or 12' is stopped by means of the clutch brake 15 or 15'. Then, the plate S can be transferred onto the desired horizontal table $P_1$ or $P_2$, by releasing the suction of the cups $u_2$ by operating the pusher 41', actuating rods 40', and the operating levers 39' for causing the brake guides 38' to engage the feeler rods 37' of the suction cups $u_2$.

In the embodiment, as shown in FIG. 5, additional brake guides 38'' are provided, one each for every suction cup $u_1$ or $u_2$. Each additional brake guide 38'' is actuated together with the corresponding brake guide 38 or 38', through an auxiliary link 39''.

In FIGS. 1 and 2, only two horizontal tables $P_1$ and $P_2$ are illustrated, but the present invention is not restricted to such number of the horizontal tables. It is possible to incorporate any number of such horizontal tables in the conveyor assembly of the present invention, together with the corresponding number of auxiliary conveyor sets, so that the input plates can be sorted into any desired number of groups as they are moved through the conveyor assembly.

If a suitable packing material, such as a box, is placed on the horizontal table, the packing and shipping operation can greatly be simplified.

Furthermore, if the aforesaid operation is actuated in the reverse sequence, it is possible to effect the depiling of several separate piles of plates S. More particularly, referring to FIGS. 1 to 7, the lower part of the looped auxiliary conveyor chains 12 or 12' at rest are lowered for holding one plate from the horizontal table $P_1$ or $P_2$ by means of the pushers 23, the operating levers 27, the bell cranks 25, the links 26, and the chain guides 24'. Due to the vacuum pressure at the suction cups $u_2$, the auxiliary conveyor chains 12 or 12' hold the top plate S on the horizontal table $P_1$ or $P_2$, upon such lowering. Then, the chain guides 24' are raised by reversely operating the pushers 28, while simultaneously accelerating the chains 12 or 12' by actuating the clutch 15 or 15', until the linear speed of the chains 12 or 12' becomes identical with the uniform speed of the main conveyor chains 2. After the proper speed relation is established, the chain guides 24' are further raised until the suction cups $u_1$ of the main conveyor chains 2 get hold of the plate S. Then, the vacuum pressure of the suction cups $u_2$ are released by means of the pusher 41', actuating rods 40', and brake operating levers 39' for causing the brake guides 38' and 38'' to engage the feeler rods 37' of the suction cups $u_2$. Thus, the plate S is transferred from the auxiliary conveyor chains 12 or 12' to the main conveyor chains 2. Thereafter, the chain guides 24' for the auxiliary conveyor chains 12 or 12' are raised to the positions, as shown by solid lines in FIG. 5, so as to come to rest at the raised positions. As soon as the plate thus raised is cleared from the space immediately above the horizontal table $P_1$ or $P_2$, the desired ones of the auxiliary conveyor chains 12 and 12' are ready to operate, for effecting the depiling by repeating the aforesaid process of lowering the auxiliary conveyor chains for holding the plate S, raising and accelerating the auxiliary conveyor chains, transferring the plate S to the main conveyor chains 2, and further raising and stopping the auxiliary conveyor chains. The plates thus transferred to the main conveyor chains 2 may be either delivered to an outlet conveyor (not shown) or piled in another form (not shown), by releasing them from the main conveyor chains 2 in the manner as described in the foregoing referring to the sorting process.

Thus, it is now apparent that the conveyor assembly of the present invention can be used both for sorting one group of plates into several groups by piling or for collecting several groups of piled plates into one common group.

FIG. 8 illustrates another embodiment of the plate handling device according to the present invention. In the preceeding embodiment, as shown in FIGS. 1 to 7, the entire span of each auxiliary conveyor chain 12 or 12' was subjected to vertical reciprocation, but in the embodiment of FIG. 8, the length of that portion of the path of auxiliary conveyor chain which vertically reciprocates is variable. In other words, the entire span of chain guides 24' is sectionalized into a plurality of parts, e.g., 24'' and 24''', by using a plurality of joints 30', 30'' and sets of control mechanisms disposed along elongated auxiliary conveyor chains. Each set of the control mechanism includes pusher 28' or 28'' which actuates a plurality of bell cranks through operating levers 27', 27'' for raising or lowering the corresponding parts of the chain guides 24'. The construction of each set of the control mechanism is substantially identical with what was disclosed hereinbefore by referring to FIGS. 7 and 8.

The advantage of the embodiment of FIG. 8 is in that, although the length of plate S to be handled by the preceding embodiment as shown in FIGS. 1 to 7 is limited by the length of the individual group of auxiliary conveyor chains 12 or 12', the embodiment of FIG. 8 can handle a very long plate by simultaneously actuating serially disposed groups of auxiliary conveyor chains.

As described in the foregoing disclosure, according to the present invention, plates with smooth surface can be handled by a suspension-type conveyor assembly without interrupting the rotation of its main looped conveyors of wrapping-type. Thus, the efficiency of handling such plates is greatly improved. Furthermore, the elimination of the start-stop of the main conveyor for each handling of the individual plate results in the simplification of the control device and the operation of such conveyor assembly.

What is claimed is:

1. A handling device for mounting and dismounting plates with smooth surface to and from a suspension-type conveyor assembly including at least one main endless conveyor means of wrapping-type and rows of suction cups secured to the conveyor means, the handling device comprises a plurality of auxiliary suspension-type conveyor means disposed between adjacent rows of the suction cups of the main endless conveyor means, the auxiliary conveyor means having auxiliary suction cups, each auxiliary conveyor means having a vertically reciprocable portion whose span being shorter than the span of the main conveyor means, whereby the plates can be mounted and dismounted to and from the suspension-type conveyor assembly without interrupting the movement of the main conveyor means by using the suction of the auxiliary conveyor means while controlling the running speed of the auxiliary conveyor means between zero and the speed of the main conveyor means.

2. A handling device according to claim 1, wherein each of the auxiliary conveyor means has a looped path of movement, of which lower portion is vertically reciprocable.

3. A handling device according to claim 1, wherein each of the auxiliary conveyor means has an elongated looped path of movement, of which lower portion includes a plurality of parts, said parts being selectively and individually reciprocable in vertical direction.

4. A handling device according to claim 1, wherein each auxiliary conveyor means includes a tension means for providing a tension to the conveyor means and a vertically reciprocating means for raising and lowering the lower portion of the auxiliary conveyor means against the tension.

5. A handling device according to claim 1, wherein the auxiliary suction cups are secured to the auxiliary conveyor means with a spring inserted between each suction cup and the auxiliary conveyor means.

6. A handling device according to claim 1, wherein each auxiliary conveyor means consists of a plurality of looped chain conveyors.

* * * * *